United States Patent [19]
Wallace

[11] Patent Number: 6,044,151
[45] Date of Patent: Mar. 28, 2000

[54] APPARATUS FOR MOUNTING A LOW PASS FILTER IN A TELEPHONE NETWORK INTERFACE BOX

[75] Inventor: K. Michael Wallace, Raleigh, N.C.

[73] Assignee: Alcatel, Paris, France

[21] Appl. No.: 08/889,928

[22] Filed: Jul. 10, 1997

[51] Int. Cl.[7] .............................. H04M 1/00; H04M 3/00
[52] U.S. Cl. ............................................... 379/399; 379/328
[58] Field of Search ..................................... 379/429, 399, 379/327, 328, 329, 330

[56] References Cited

U.S. PATENT DOCUMENTS

| | | | |
|---|---|---|---|
| 2,740,528 | 4/1956 | Kaiser | 379/328 |
| 4,945,559 | 7/1990 | Collins et al. | 379/399 |
| 4,979,209 | 12/1990 | Collins et al. | 379/399 |

*Primary Examiner*—Jack Chiang
*Attorney, Agent, or Firm*—Ware, Fressola, Van Der Sluys & Adolphson LLP

[57] ABSTRACT

In a telephone network interface box (TNIB), an apparatus is provided for mounting a low pass filter in the TNIB. The apparatus is comprised of a base plate and at least one snap pin.

5 Claims, 6 Drawing Sheets

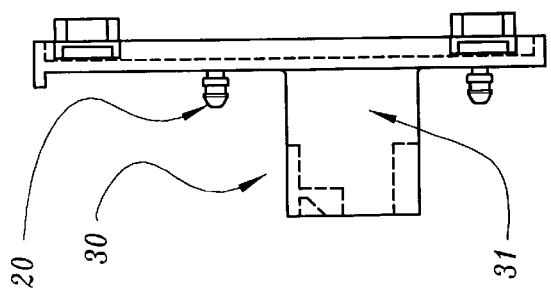
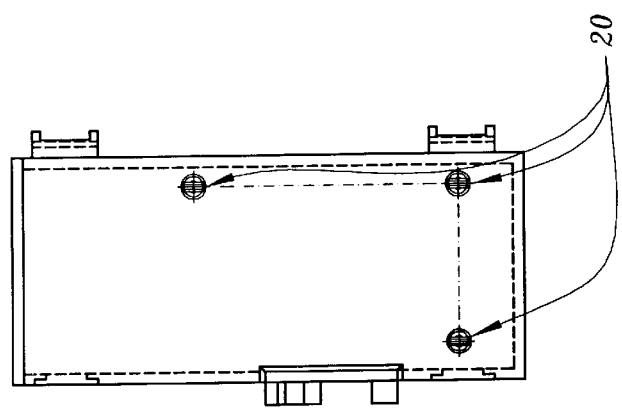
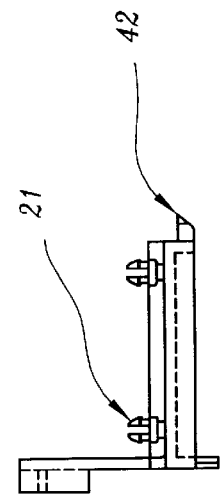
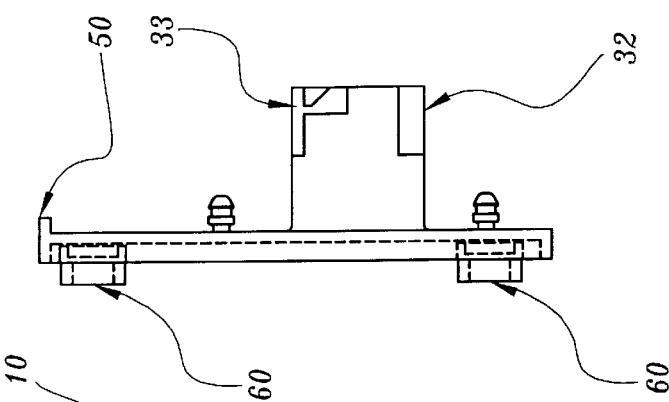
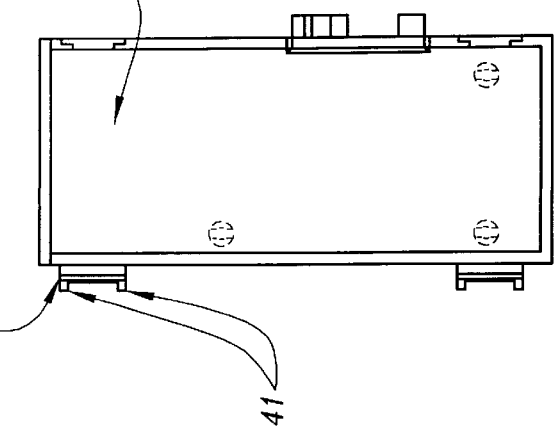

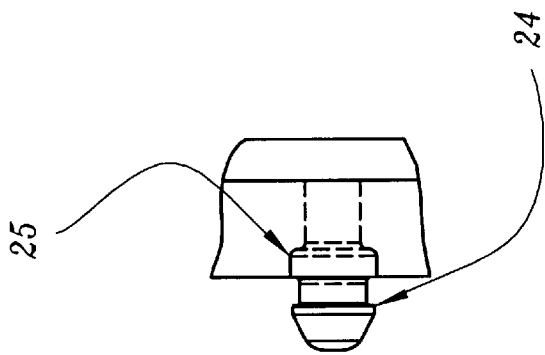
FIG. 2B
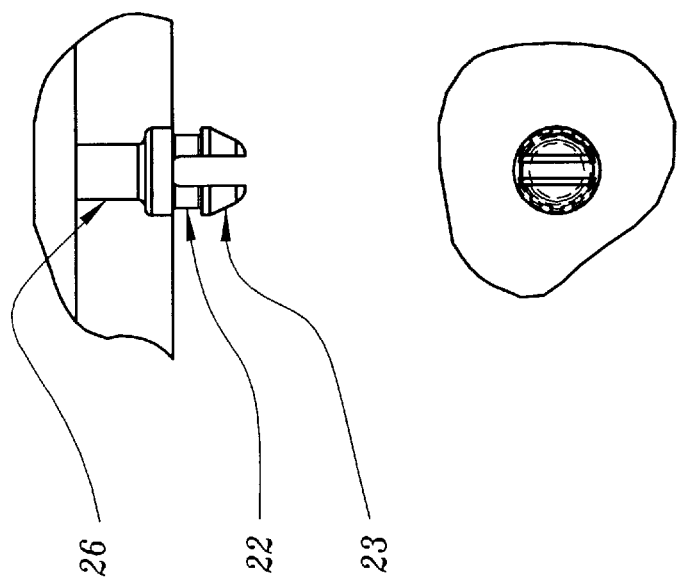
FIG.2C
FIG. 2A

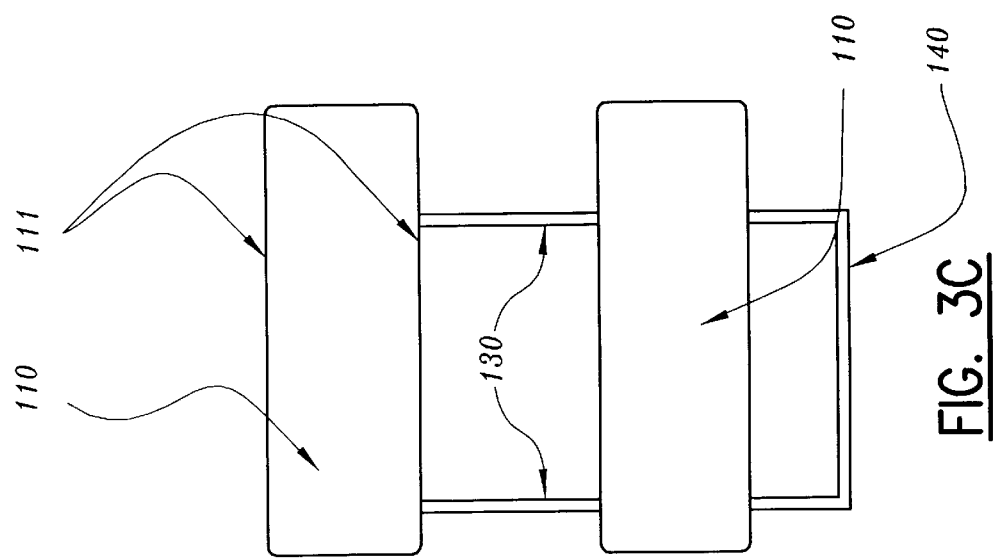
FIG. 3C
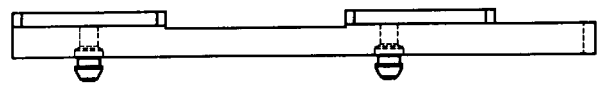
FIG. 3B
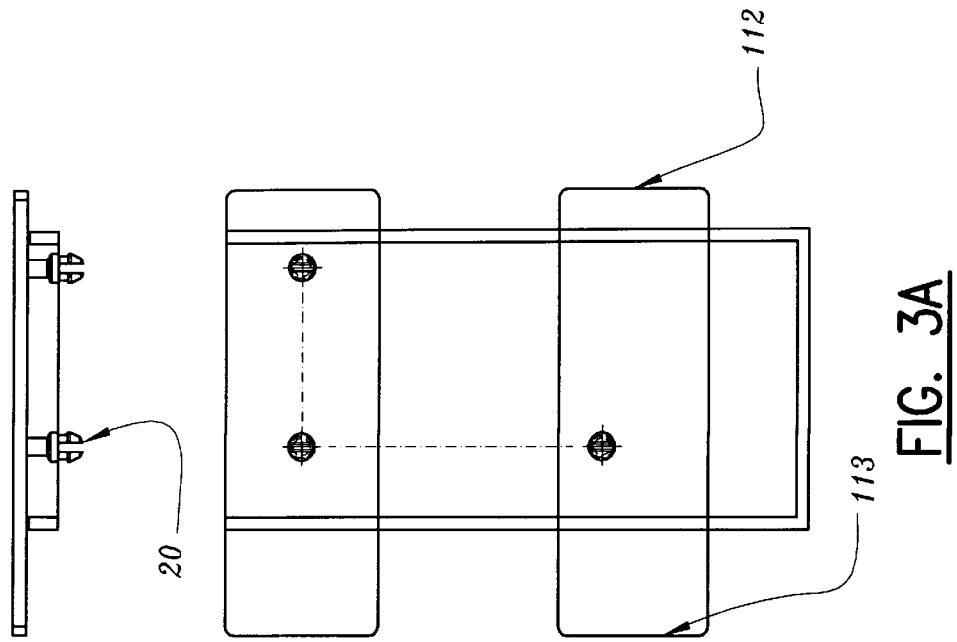
FIG. 3D
FIG. 3A

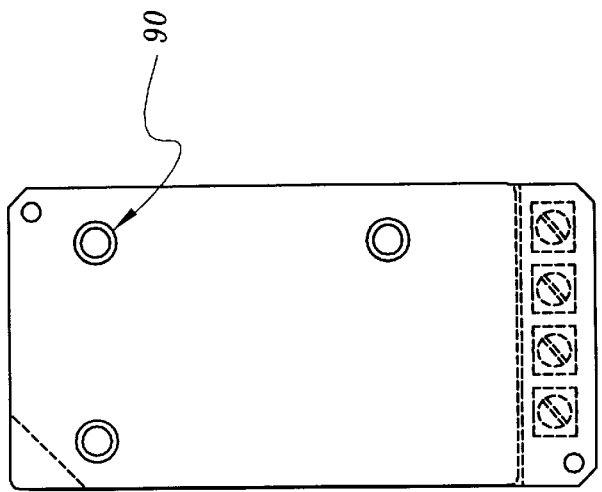
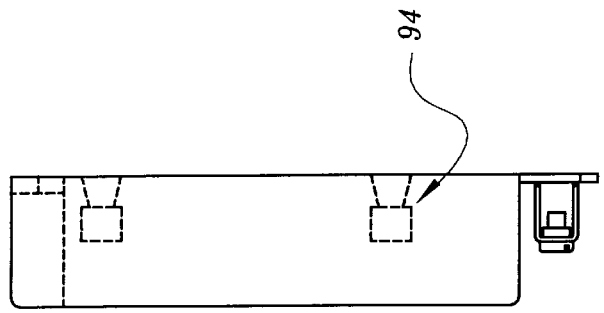
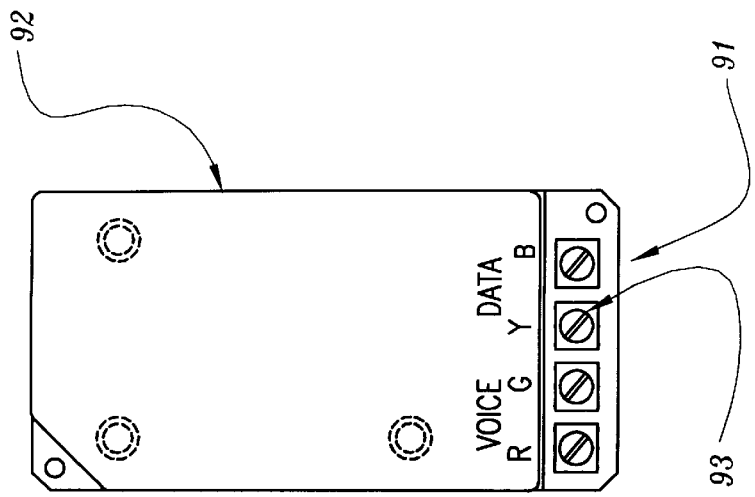

6,044,151

APPARATUS FOR MOUNTING A LOW PASS FILTER IN A TELEPHONE NETWORK INTERFACE BOX

BACKGROUND OF THE INVENTION

1. Field of the Invention

The present invention relates generally to apparatuses which mount equipment, usually an electrical device, inside an enclosure.

2. Discussion of Related Art

A telephone network interface box ("TNIB") is a housing which provides a junction for at least one telephone line, often owned by the telephone service provider. In most cases, a TNIB will also provide one or more junctions for additional telephone lines for possible use by the telephone service user. Electrical connections between the various junctions are provided by the TNIB for connecting the various telephone lines. In order to accommodate service technicians, TNIBs often provide locations for electrically connecting a test jack at various points, i.e. corresponding to the junctions. TNIBs thus often have more than one location for a test jack in order to facilitate testing of more than one line.

Along with the increased use of telephone lines to transmit data, has come an increased need to connect electrical devices to a telephone line which accommodate voice and/or data transmission over the telephone line. According to a copending and coowned U.S. patent application (Atty. Docket No. 907-153) entitled "Subscriber Access Multiplexer System" filed on even date herewith, in order to accommodate both traditional voice communication and data transmission via Asynchronous Digital Subscriber Line on a standard telephone line, it is desirable to install a low-pass filter on the telephone line. TNIBs afford a location for installing such a low-pass filter. However, the locations in some TNIB's suitable for accepting a junction and test jack are not suitable for accepting some low pass filter housings having a low-pass filter thereon. Therefore, a mounting apparatus is needed which will permit a low pass filter housing to be mounted in the empty line junction locations intended for test jacks in a TNIB. There is currently no known means for easily and quickly mounting a low pass filter in a TNIB.

SUMMARY OF THE INVENTION

Accordingly, it is an object of the present invention to provide an apparatus which will mount a low pass filter inside a TNIB.

It is also an object of the present invention to provide an apparatus which will easily and quickly mount a low pass filter inside a TNIB.

The foregoing objectives are realized by the mounting apparatus of the present invention which comprises a base plate and at least one snap suitable for attaching to the TNIB and the low pass filter housing.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include:

FIGS. 1A, 1B, 1C, 1D, and 1E which show the front, right side, left side, bottom and end views respectively of the first embodiment of the mounting apparatus;

FIGS. 2A, 2B and 2C which show three views of the snap pin;

FIGS. 3A, 3B, 3C, and 3D which show the front, right side, bottom and end views respectively of the second embodiment of the mounting apparatus;

FIGS. 8A, 8B, and 8C which shows the front, right side and bottom views respectively of the low pass filter housing for being mounted on the mounting apparatus of FIG. 1 or FIG. 3.

DETAILED DESCRIPTION OF THE INVENTION

Figure 4:
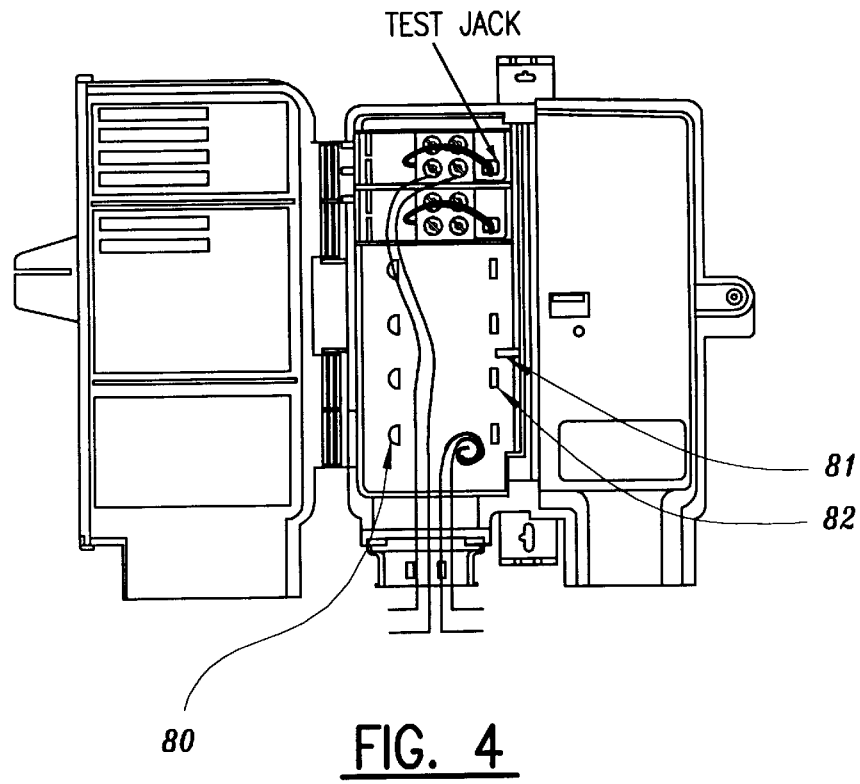
FIG. 4 which depicts the TNIB associated with the first embodiment of the mounting apparatus.
Figure 5:
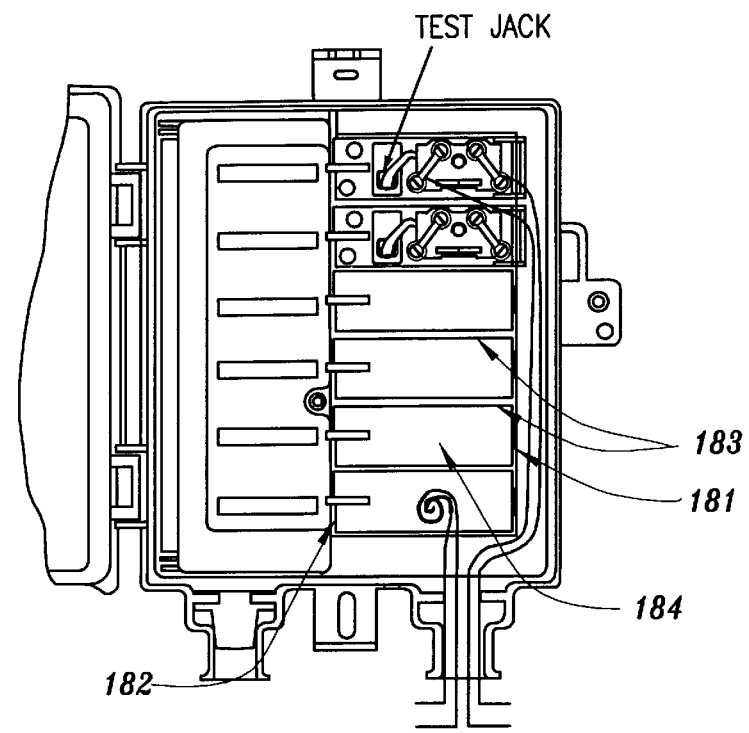
FIG. 5 which depicts the TNIB associated with the second embodiment of the mounting apparatus.
Figure 6:
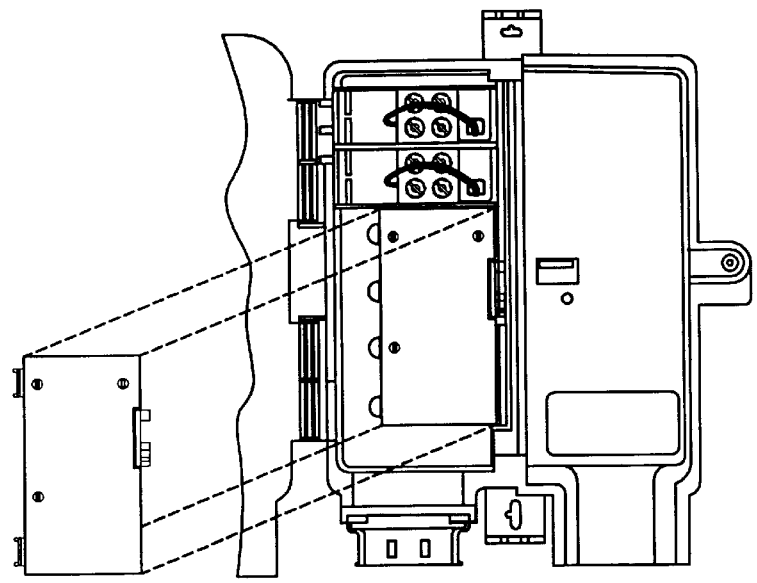
FIG. 6 which depicts the first embodiment of the mounting apparatus installed in the TNIB of FIG. 4.
Figure 7:
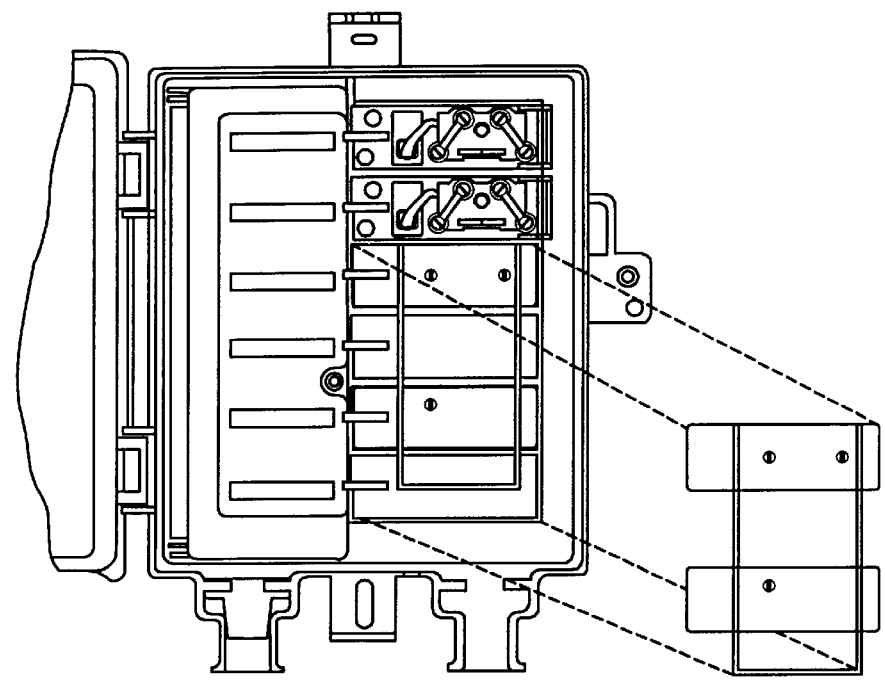
FIG. 7 which depicts the second embodiment of the mounting apparatus installed in the TNIB in the TNIB of FIG. 5.

The mounting apparatus of the present invention may be used for mounting electrical equipment inside a telephone network interface box ("TNIB"). Turning now to the drawings, in FIGS. 1A through 1E and 2A through 2C there is shown a first embodiment of the mounting apparatus which permits a low pass filter housing (see FIGS. 8A through 8C) manufactured by the assignee hereof to be mounted in a TNIB manufactured by Keptel (see FIG. 4). The apparatus comprises a base plate 10, three snap pins 20, a tower 30, two clip ledges 40, a support ledge 50, and two legs 60. Each snap pin 20 is comprised of snap riser 26, snap bumper 25 and forked nose 21. Each tine of a forked nose 21 is comprised of a beveled tip 23, a nose body 22 and a catching surface 24 formed at the junction of beveled tip 23 and nose body 22. The tower 30 is comprised of tower riser 31, and tower clip 33. Each clip ledge 40 is comprised of a pair of teeth 41 and a bevelled surface 42.

Referring to FIGS. 1A through 1E, 4 and 6, in order to insert the mounting apparatus of the first embodiment into the TNIB, each clip ledge 40 is inserted into the TNIB under a clip 80 in the TNIB and so that a portion of the clip 80 is positioned between the pair of teeth 41. Next, the mounting apparatus is rotated so that each leg 60 is inserted into a well 82 in the TNIB, and so that the finger 81 engages the tower clip 33 in order to secure the mounting apparatus and prevent it from falling out of the TNIB.

Referring to FIGS. 1A through 1E, 2A through 2C and 8A through 8C, the low pass filter housing 92 is mounted on the mounting apparatus by positioning the three snap pins 20 of the mounting apparatus in line with three corresponding snap pin receivers 90 located on the low pass filter housing 92. The low pass filter housing 92 is then pressed toward the base plate 10 so that the snap pin receivers 90 deflect the tines of forked nose 21 toward each other. Further pressing the low pass filter housing 92 toward the base plate 10 causes the catching surface 24 of the forked nose 21 to engage a catching edge 94 in the snap pin receiver 90 thereby engaging the low pass filter housing 92 and preventing the low pass filter housing 92 from moving away from the base plate 10. The snap bumper 25 provides a surface against which the low pass filter housing 92 abuts so that the low pass filter housing 92 does not contact the base plate 10.

It should be apparent from the foregoing description that although the first embodiment of the present invention is depicted in FIGS. 1A through 1E having three snap pins 20, fewer than three snap pins 20 may be provided. In addition, although the first embodiment is depicted in FIGS. 1A through 1E having two clip ledges 40 and two legs 60, only one of each is required.

When the low pass filter housing 92 is mounted on the mounting apparatus of the first embodiment, the support ledge 50 is positioned behind the terminal panel 91. When a technician is connecting a wire to one of the terminals 93 on the terminal panel 91, the support ledge 50 prevents deflection of the terminal panel 91.

Referring to FIGS. 2A through 2C and 3A through 3D, there is shown a second embodiment of the present invention which permits a low pass filter manufactured by the assignee hereof to be mounted in a TNIB manufactured by Siecor. In the second embodiment depicted in FIGS. 2A through 2C, the mounting apparatus comprises three snap pins 20, two spacer bars 130, a support bar 140, and two base plates 110, each of which has two major edges 111, a right minor edge 112 and a left minor edge 113.

Referring to FIGS. 3A through 3D, 5 and 7, in order to insert the mounting apparatus of the second embodiment into the TNIB, the right minor edge 112 of each base plate 110 is inserted into a cavity (not shown) on a clip 181 in the TNIB. Next, the mounting apparatus is rotated, keeping the right minor edge 112 of the base plate 110 in the cavity (not shown), so that the left minor edge 113 of each base plate 110 engages and depresses a flexible ledge 182 in the TNIB. Further rotation of the mounting apparatus and depression of the flexible ledges 182 will eventually cause the left minor edge 113 of each base plate 110 to move past and underneath the corresponding flexible ledge 182 at which time the flexible ledges 182 will spring back into their non-depressed position thereby capturing the left minor edge 113 of each base plate 110 between the rear wall 184 of the TNIB and the corresponding flexible ledge 182. In this position, the major edges 111 of each base plate 110 are adjacent to the dividers 183 in the TNIB.

Next, the low pass filter housing 92 shown in FIGS. 8A through 8C is mounted on the mounting apparatus in the same manner described above with respect to the first embodiment. When the low pass filter housing 92 is mounted on the mounting apparatus of the second embodiment, the support bar 140 is positioned behind the terminal panel 91 and prevents deflection of the terminal panel 91 in the same manner as described above with regard to the support ledge 50 of the first embodiment.

It should be apparent from the foregoing description that although the second embodiment of the present invention is depicted in FIGS. 3A through 3D having three snap pins 20, fewer than three snap pins 20 may be provided. In addition, although the second embodiment is depicted in FIGS. 3A through 3D having two spacer bars 130, only one is required.

As can be seen from the foregoing detailed description of the preferred embodiments of the invention, the mounting apparatus provides a means of easily and quickly mounting an electrical device inside a TNIB.

Although the present invention has been described with respect to one or more particular embodiments of the apparatus, it will be understood that other embodiments of the present invention may be made without departing from the spirit and scope of the present invention. Hence, the present invention is deemed limited only by the appended claims and the reasonable interpretation thereof.

I claim:

1. An apparatus for mounting an electrical device in a telephone network interface box (TNIB) comprising:

a first base plate;

a snap pin connected to said base plate for engaging a snap pin receiver located on said electrical device;

a tower connected to said base plate and having a tower clip for engaging a finger in said TNIB;

a clip ledge connected to said base plate for engaging a clip in said TNIB; and a leg connected to said base plate for being received by a well in said TNIB.

2. The apparatus of claim 1 further comprising a support connected to said base plate for supporting a terminal panel of said electrical device.

3. The apparatus of claim 1 further comprising:

a second base plate; and a spacer bar connected to said first and second base plates for maintaining a desired distance between said base plates.

4. The apparatus of claim 3 further comprising a support bar connected to at least one of the base plates for supporting a terminal panel of said electrical device.

5. The apparatus of claim 1 further comprising a support ledge connected to said base plate for supporting a terminal panel of said electrical device.

* * * * *